UNITED STATES PATENT OFFICE.

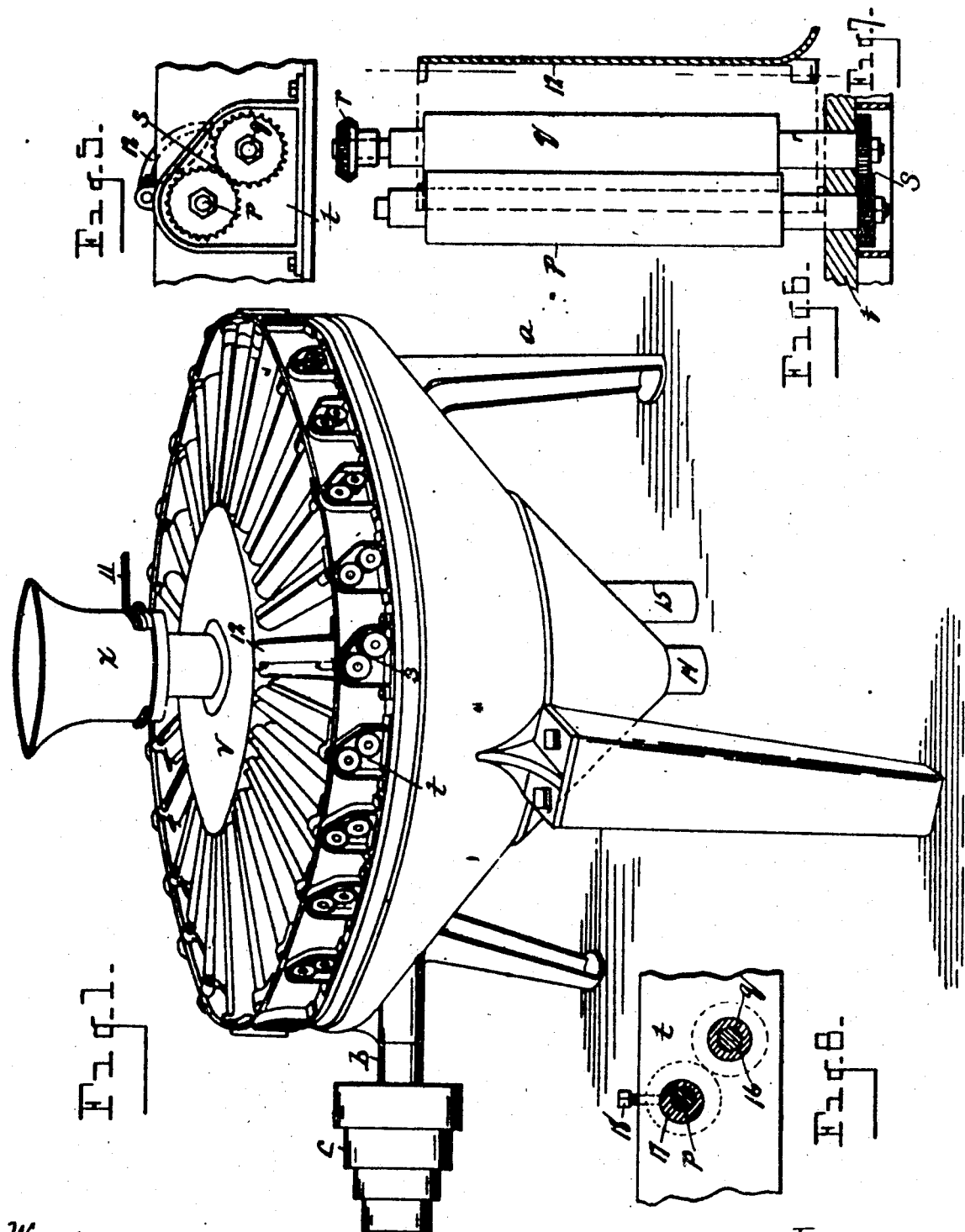

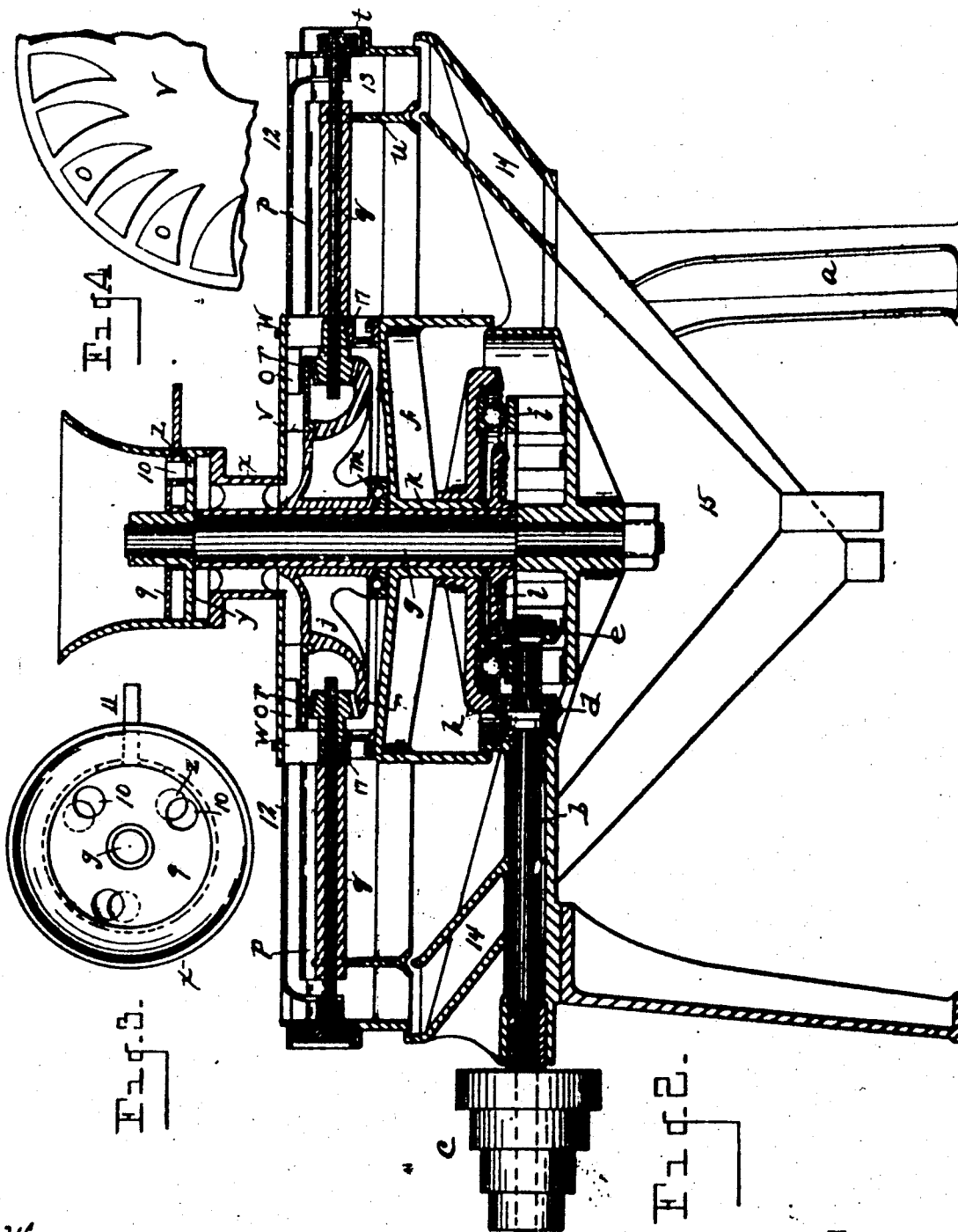

GEORGE FRANKLIN CRIPPEN, OF DETROIT, MICHIGAN.

BEAN-PICKING MACHINE.

937,695.

Specification of Letters Patent.   Patented Oct. 19, 1909.

Application filed November 12, 1906.   Serial No. 343,070.

*To all whom it may concern:*

Be it known that I, GEORGE FRANKLIN CRIPPEN, a citizen of the United States, residing at Detroit, county of Wayne, State of Michigan, have invented a certain new and useful Improvement in Bean-Picking Machines, of which the following is a specification, reference being had to the accompanying drawings, which form a part of this specification.

My invention has for its object to provide an improved bean picking machine of superior efficiency and utility, the same being designed as an improvement upon a machine of this description for which Letters Patent of the United States were granted to me March 1, 1904, No. 753,370.

My invention consists of the construction, combination and arrangement of devices hereinafter described and claimed and illustrated in the accompanying drawings, in which, Figure 1 is a view in perspective illustrating my invention. Fig. 2 is a view in vertical section. Fig. 3 is a plan view of the hopper. Fig. 4 is a partial inverted view of the shield over the distributing plate. Fig. 5 is an enlarged detail view in side elevation showing features of my invention. Fig. 6 is a plan view of a pair of picking rolls. Fig. 7 is a view in longitudinal section through one of the swinging covers or shields. Fig. 8 is a detail view in section showing an eccentric bearing for one of the picking rolls.

Among my present improvements are: 1. Means for leading the grain more directly down and distributing it upon the picking rolls. 2. Means for driving all the rolls from a single gear. 3. Arranging the pairs of picking rolls all upon a horizontal plane. 4. Shielding the passage ways between the pairs of picking rolls. 5. Providing means to space the picking rolls of each pair nearer to or further apart one from the other. 6. Shielding the passage ways between the pairs of picking rolls with a swinging cover. 7. Providing the machine with guides to steer the grain between the rolls of each pair. 8. To provide a shield above the distributing plate. 9. To provide the machine with a horizontal revolving distributing plate to receive the grain from the hopper. 10. To provide means whereby the grain distributing plate will travel faster than the carrier plate which carries the picking rolls, to give motion to the picking rolls upon their axes. 11. To provide means whereby the distributing plate and picking rolls may be adjusted to rotate faster or slower at the will of the operator. 12. Providing means whereby the grain is distributed by centrifugal force across the rolls.

I carry out my invention as follows:

In the drawings $a$ represents any suitable support, and $b$ is a driving shaft carried upon said support, the driving shaft being shown provided with stepped pulleys indicated at $c$. The driving shaft is provided with a driving pinion $d$ and with an additional driving pinion $e$. A carrier plate is indicated at $f$, the same being horizontally rotatable about a vertical shaft $g$ having its bearings upon the support. This carrier plate is provided with a gear indicated at $h$ meshing with the driving gear $d$, the gear $d$ being carried upon ball bearings indicated at $i$. A horizontal distributing plate is indicated at $j$, the same being rotatable about the vertical shaft $g$, the distributing plate being mounted upon a sleeve indicated at $k$, said sleeve provided with a gear $l$ meshing with the driving pinion $e$. The distributing plate is carried upon ball bearings indicated at $m$ and is provided with a gear $n$.

Supported upon the carrier plate $f$ are a series of picking rolls arranged in pairs, the rolls of each pair being indicated at $p$ and $q$, the axis of one roll of each pair being preferably operative in a higher horizontal plane than the axis of the companion roll. One roll of each pair is provided with a pinion $r$ meshing with the gear $n$ of the distributing plate, whereby motion is imparted to the corresponding roll, the rolls of each pair being geared together as indicated at $s$. The carrier plate $f$ is provided with bearings $t$ for the outer ends of the rolls, and with an inner annular division wall indicated at $u$. Above the distributing plate $j$ is a shield $v$ provided on its under surface with guides $o$ to direct the grain between the rolls of each pair.

Upon the shield $v$ is mounted a hopper $x$ to feed the grain upon the upper surface of the horizontally revolving distributing plate $j$. Any suitable hopper may be employed. I have shown a hopper provided with a partition $y$ provided with feed openings $z$.

Above the wall y is a movable feed plate indicated at 9 provided with feed openings 10, the plate 9 being adjustable as by a handle 11 so that the feed openings therein may register with the feed openings in the base of the hopper or be shut off therefrom at the will of the operator. The picking rolls of each pair are arranged in more or less close contact the one with the other, the arrangement being such that the foul stuff in the beans may be caught by the picking rolls and passed therebetween, a passage way being formed between the rolls of each pair, the passage way being shielded by a swinging cover indicated at 12.

Between the outer periphery of the carrier plate f and the division wall u is a discharge opening indicated at 13 discharging into a discharge chute 14. The foul stuff passing through between the pairs of picking rolls is discharged into a discharge chute 15. The axes of the picking rolls are provided with bushings, the bushing of the lower roll being indicated at 16, and the bushing of the upper roll being indicated at 17, the latter bushing being eccentric and adjustable upon its axis and held in any given position of adjustment by means, for example, of a set screw 18. If it is desired to separate the picking rolls or to bring them more firmly together by loosening up on the screw 18 the eccentric bushing can be moved about the corresponding axis as desired.

The operation of the machine will now be understood. Grain from the hopper is fed down upon the distributing plate j which throws the grain directly upon the inner ends of the picking rolls, the grain being directed to the passage between the rolls by the guides o. By centrifugal force the grain is driven across the rolls and longitudinally thereof. The poor stuff, by reason of its rough and frictional surfaces, is drawn down through between the pairs of rolls, the good grain being smooth and "unfrictional" is thrown along longitudinally of the rolls by centrifugal force, and discharged therefrom at the outer ends of the rolls into the discharge passage 14, the poor stuff falling down after passing through between the rolls into the discharge passage 15. The machine may readily be adjusted to operate faster or slower, as may be desired, by changing the speed which may readily be accomplished by means of the stepped driving pulleys. It will readily be understood that if the speed be increased the centrifugal force will drive the grain faster along the rolls, giving less opportunity for the refuse to be eliminated therefrom. By employing a lesser speed the reverse will be true.

It will be understood that the rolls are covered with suitable rubber.

The base of the hopper w rotates about the shaft g, being secured upon the sleeve k. The bushings 17 are located in bearings w carried by the carrier plate f. The outer portion of the cover plate n rotates with the carrier plate carrying the guides o therewith, the inner portion of the shield b rotating with the base of the hopper.

What I claim as my invention is:

1. A bean picking machine comprising a rotatable distributing plate, pairs of rolls radially arranged about the periphery of the feeding plate and having horizontal axes, means to feed the grain to said plates, and means to rotate the rolls about the distributing plate, said distributing plate arranged to feed the grain by centrifugal force to said rolls.

2. A bean picking machine comprising a central rotatable distributing plate, pairs of radially arranged rolls forming a passage way therebetween and having horizontal axes, means to feed the grain to said plate, a shield for each passage way between said rolls, and means to rotate the rolls about the distributing plate, said distributing plate arranged to feed the grain by centrifugal force to the rolls.

3. A bean picking machine comprising a rotatable distributing plate, pairs of rolls radially arranged about the periphery of the distributing plate, forming a passage way therebetween and having horizontal axes, means to feed the grain to said plate, a swinging shield for each passage way between said rolls, and means to rotate the rolls about the distributing plate, said distributing plate arranged to feed the grain by centrifugal force to the rolls.

4. A bean picking machine comprising a rotatable distributing plate, pairs of rolls radially arranged about the periphery of the distributing plate and having horizontal axes, means to feed the grain to said plate, the rolls of each pair being in different horizontal planes, and means to rotate the rolls about the periphery of the distributing plate, said distributing plate arranged to feed the grain by centrifugal force to the rolls.

5. A bean picking machine comprising a rotatable distributing plate, pairs of rolls rotatable upon horizontal axes, means to feed the grain to said plate, said pairs of rolls radially arranged about the periphery of the distributing plate, and means to rotate the pairs of rolls circumferentially about the periphery of the distributing plate.

6. A bean picking machine comprising a rotatable distributing plate, pairs of rolls radially arranged about the periphery of said distributing plate and having horizontal axes, means to feed the grain to said plate, and a single driving gear to rotate said pairs of rolls, said distributing plate arranged to feed the grain by centrifugal force to the rolls.

7. A bean picking machine comprising a rotatable distributing plate, pairs of rolls arranged about the periphery of the distributing plate and having horizontal axes, means to feed the grain to said plate, and a horizontally rotatable carrier plate upon which said pairs of rolls are radially arranged, said distributing plate arranged to feed the grain by centrifugal force to the rolls.

8. A bean picking machine comprising a rotatable distributing plate, pairs of rolls arranged about the periphery of the distributing plate and having horizontal axes, means to feed the grain to said plate, a horizontally rotatable carrier plate upon which said pairs of rolls are radially arranged, and a driving gear to rotate said carrier plate, said distributing plate arranged to feed the grain by centrifugal force to the rolls.

9. A bean picking machine comprising a rotatable distributing plate, pairs of rolls radially arranged about the periphery of the distributing plate and having horizontal axes, means to feed the grain to said plate, a horizontally rotatable carrier plate to carry said rolls, the rolls of each pair being geared together at the outer ends thereof, and the inner end of one of the rolls of each pair geared with the distributing plate, said distributing plate arranged to feed the grain by centrifugal force to the rolls.

10. A bean picking machine comprising a rotatable distributing plate, pairs of radially arranged rolls having horizontal axes, a horizontally rotatable carrier plate arranged to travel about the periphery of the distributing plate and carrying said rolls, the pairs of rolls being geared together at their outer ends, and one roll of each pair geared with the distributing plate, and means to drive the distributing plate faster than the carrier plate, said distributing plate arranged to feed the grain by centrifugal force to the rolls.

11. A bean picking machine comprising a rotatable distributing plate, pairs of rolls radially arranged about the periphery of the distributing plate and having horizontal axes, means to feed the grain to said plate, means to rotate the rolls about the distributing plate, and a shield located above the distributing plate, said distributing plate arranged to feed the grain by centrifugal force to the rolls.

12. A bean picking machine comprising a rotatable distributing plate, pairs of rolls radially arranged about the periphery of the feeding plate and having horizontal axes, means to feed the grain to said plate, means to rotate the rolls about the periphery of the distributing plate, and a shield located above the distributing plate provided with guides on its under surface to steer the grain between the rolls of each pair, said distributing plate arranged to feed the grain by centrifugal force to the rolls.

13. A bean picking machine comprising a rotatable distributing plate, a horizontally rotatable carrier plate, pairs of rolls journaled upon the carrier plate radially arranged about the periphery of the distributing plate and having horizontal axes, and means to feed the grain to said distributing plate, said distributing plate arranged to feed the grain by centrifugal force to the rolls.

14. A bean picking machine comprising a rotatable distributing plate, pairs of rolls radially arranged about the periphery of the distributing plate and having horizontal axes, means to feed the grain to said plate, a carrier plate horizontally rotatable about the periphery of the distributing plate, the pairs of rolls being journaled upon the carrier plate in different horizontal planes, said distributing plate arranged to feed the grain by centrifugal force to the rolls.

15. A bean picking machine comprising a rotatable distributing plate, pairs of rolls radially arranged about the periphery of the distributing plate and having horizontal axes, means to feed the grain to said plate, a carrier plate arranged to rotate about the periphery of the distributing plate and carrying said rolls, said carrier plate provided with a separating annular wall toward the outer ends of the rolls, said distributing plate arranged to feed the grain by centrifugal force to the rolls.

16. A bean picking machine comprising a rotatable distributing plate, pairs of rolls radially arranged about the periphery of the distributing plate and having horizontal axes, and means to feed grain to the distributing plate, said distributing plate arranged to feed the grain by centrifugal force to the rolls.

17. A bean picking machine comprising a rotatable distributing plate, pairs of rolls arranged about the periphery of the distributing plate and having horizontal axes, means to feed the grain to said plate, means to rotate the rolls about the periphery of the distributing plate, a discharge passage at the outer ends of the rolls, and a discharge passage to carry away the waste passing between the rolls, said distributing plate arranged to feed the grain by centrifugal force to the rolls.

18. A bean picking machine comprising pairs of radially arranged rolls having horizontal axes, means located within the inner ends of said rolls to feed the grain by centrifugal force to the inner ends of said rolls, and means to rotate the pairs of rolls circumferentially.

19. A bean-picking machine comprising a rotatable distributing-plate; rolls arranged around said plate, on horizontal axes, in pairs, the members of each pair forming between them a channel for the passage of the grains; and means for guiding the grains thereto from the distributing-plate.

20. In a bean picking machine, the combination with the base, of a supporting standard, a spider sleeved on said standard, means for rotating said spider, rolls arranged in pairs on said spider, a gear for driving the rolls sleeved on said standard, a feed disk, and means for rotating said gear and disk.

21. In a bean picking machine, the combination of a series of picking rolls placed side by side and arranged in radial groups of two or multiple thereof, one of each group having an extended shaft through which motion is transmitted to the group and a central driving medium comprising a distributing plate rotating concentrically within the rolls for revolving said rolls and feeding the beans outward by centrifugal force and separate means for imparting circumferential motion to said rolls in the horizontal plane of their axis.

22. In a bean picking machine, the combination of radial groups of picking rolls each group comprising one pair of rolls or multiple thereof placed side by side, one roll of each being a driving roll and having an inwardly extended shaft carrying a bevel drive pinion in combination with a central drive gear forming a distributing plate rotating concentrically within the groups of picking rolls for revolving the driving rolls and distributing the beans by centrifugal force and separate means for imparting motion to the rolls in the plane of their axis.

23. In a bean picking machine, the combination of a plurality of radial groups of picking rolls each group comprising one pair of rolls, one roll of each being a driving roll and having an inwardly extended shaft carrying a driving gear, a central drive gear forming a distributing plate rotating within the groups of picking rolls and imparting motion to the driving rolls, means to feed the beans to said plate and means for revolving said rolls in the horizontal plane of their axis.

24. In a centrifugal bean picking machine, the combination with the base of a supporting standard, a spider sleeved on said standard, means for rotating said spider, rolls radially arranged in pairs on said spider and having horizontal axes, a gear for driving the rolls sleeved on said standard, a feed disk carried by said gear, means for feeding the beans thereto and means for rotating said gear and disk to revolve the rolls and feed the beans thereto by centrifugal force.

25. In a centrifugal bean picking machine, the combination with the base of a supporting standard, of a spider sleeved on said standard, picking rolls radially arranged in pairs on said spider, gears on said rolls meshing with each other, one of each pair of rolls having an extended end, carrying a drive pinion, a gear sleeved on the standard meshing with said pinions, a rotary feed disk revolving with the gear, means for feeding the beans thereto, a stationary fingered ring above the feed disk, forming feed spouts for each pair of rolls, and means for rotating said gear and disk to feed the beans to said rolls by centrifugal force.

26. In a centrifugal bean picking machine, the combination of the base, formed with concentric walls, a central supporting standard, a spider on said standard formed with concentric walls, horizontal picking rolls radially arranged in pairs on said spider in proximity to said walls, means for revolving the spider and separate means for imparting motion to the rolls and feeding the beans thereto by centrifugal force.

In testimony whereof, I have signed this specification in the presence of two subscribing witnesses.

GEORGE FRANKLIN CRIPPEN.

Witnesses:
N. S. WRIGHT,
E. M. SPIELBURG.